US008873746B2

(12) United States Patent
Long et al.

(10) Patent No.: US 8,873,746 B2
(45) Date of Patent: Oct. 28, 2014

(54) ESTABLISHING, AT LEAST IN PART, SECURE COMMUNICATION CHANNEL BETWEEN NODES SO AS TO PERMIT INSPECTION, AT LEAST IN PART, OF ENCRYPTED COMMUNICATION CARRIED OUT, AT LEAST IN PART, BETWEEN THE NODES

(75) Inventors: Men Long, Hillsboro, OR (US); Karanvir S. Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 12/695,853

(22) Filed: Jan. 28, 2010

(65) Prior Publication Data
US 2011/0182427 A1    Jul. 28, 2011

(51) Int. Cl.
  H04L 29/06    (2006.01)
  H04L 9/08     (2006.01)

(52) U.S. Cl.
  CPC ............ *H04L 9/0827* (2013.01); *H04L 9/0838* (2013.01); *H04L 63/0281* (2013.01); *H04L 63/06* (2013.01); *H04L 63/0428* (2013.01)
  USPC ................. 380/44; 380/255; 726/7; 709/227; 709/229; 709/231; 709/238

(58) Field of Classification Search
  USPC .................................................... 380/30, 44
  See application file for complete search history.

(56) References Cited

U.S. PATENT DOCUMENTS

| 4,193,131 | A  | * | 3/1980 | Lennon et al. | 380/281 |
| 7,774,484 | B1 | * | 8/2010 | Masters et al. | 709/229 |
| 8,234,699 | B2 | * | 7/2012 | Pollutro et al. | 726/7 |
| 2007/0036353 | A1 | * | 2/2007 | Reznik et al. | 380/30 |
| 2007/0101149 | A1 |  | 5/2007 | Moreillon et al. | |

(Continued)

FOREIGN PATENT DOCUMENTS

| CN | 101325486 A | 12/2008 |
| JP | 2008-288757 A | 11/2008 |

(Continued)

OTHER PUBLICATIONS

"On Communication Security in Wireless Ad-Hoc Sensor Networks"; Slijepcevic et al; Proceedings of the Eleventh IEEE International Workshops on Enabling Technologies: Infrastructure for Collaborative Enterprises (WETICE'02) 1080-1383/02 © 2002 IEEE.*

(Continued)

*Primary Examiner* — Jason Lee

(57) ABSTRACT

An embodiment may include circuitry to establish, at least in part, a secure communication channel between, at least in part, a client in a first domain and a server in a second domain. The channel may include a first and second domain sessions in the first and second domains. The circuitry may generate first and second domain session keys that may encrypt, at least in part, respectively, the first and second domain sessions. The first domain session key may be generated based upon a first domain key assigned to the first domain and a first data set associated with the first domain session. The second domain session key may be generated based upon a second domain key assigned to the second domain and a second data set associated with the second domain session.

7 Claims, 5 Drawing Sheets

(56) References Cited

U.S. PATENT DOCUMENTS

2008/0244268 A1 10/2008 Durham et al.
2009/0119510 A1 5/2009 Long et al.
2011/0004758 A1* 1/2011 Walker et al. ............... 713/168

FOREIGN PATENT DOCUMENTS

| JP | 2009-15852 A | 1/2009 |
|---|---|---|
| KR | 10-2007-0115574 A | 12/2007 |
| WO | 2011094096 A2 | 8/2011 |
| WO | 2011094096 A3 | 12/2011 |

OTHER PUBLICATIONS

Encryption and secure computer networks'; Popek et al; ACM Computing Surveys (CSUR), 1979; 26 pages.*
International Search Report and Written Opinion received for PCT Application No. PCT/US2011/021627, Mailed on Sep. 29, 2011, 9 pages.
Durham, D. D., et al., U.S. Appl. No. 12/396,125, titled "Generation and/or reception, at least in part, of packet including encrypted payload", filed on Mar. 2, 2009.
Freier, A. O., et al., "The SSL Protocol", Transport Layer Security Working Group; Internet-Draft; Netscape Communications, <draft-ietf-tls-ssl-version3-00.txt>, Nov. 18, 1996, pp. 1-63.
Rescorla, E. et al., "Datagram Transport Layer Security version 1.2", Internet-Draft, <draft-ietf-tls-rfc4347-bis-01.txt>, Nov. 2008, pp. 1-28.
Eastlake, D. "Transport Layer Security (TLS) Extensions: Extension Definitions", TLS Working Group; Internet Draft; 3rd EastLake Enterprises, <draft-ietf-tls-rfc4366-bis-03.txt>, Oct. 5, 2008, pp. 1-28.
Dierks, T. et al., "The Transport Layer Security (TLS) Protocol", Network Working Group, Aug. 2008, pp. 1-104.
Postel, J. "User Datagram Protocol", RFC 768, Aug. 28, 1980, pp. 1-3.
Krawczyk, H. et al., "HMAC: Keyed-Hashing for Message Authentication", Network Working Group, Feb. 1997, pp. 1-11.
Kent, S. et al., "Security Architecture for the Internet Protocol", Network Working Group, Nov. 1998, pp. 1-66.
Eastlake, D. et al., "US Secure Hash Algorithm 1 (SHA1)", Network Working Group, Sep. 2001, pp. 1-22.
Kent, S. et al., "Security Architecture for the Internet Protocol", Network Working Group, Dec. 2005, pp. 1-101.
Dierks, T. et al., "The Transport Layer Security (TLS) Protocol", Network Working Group; Version 1.1, Apr. 2006, pp. 1-87.
Blake-Wilson, S. et al., "Transport Layer Security (TLS) Extensions", Network Working Group, Apr. 2006, pp. 1-30.
Salowey, J. et al., "Transport Layer Security (TLS) Session Resumption without Server-Side State", Network Working Group, May 2006, pp. 1-17.
"Scalable End-to-End Security", Entire Internet Securely Connected to One Server, Research @ Intel—www.intel.com/research, 2008, 2 Pages.
International Preliminary Report on Patentability received for PCT Patent Application No. PCT/US2011/021627, mailed on Aug. 9, 2012, 8 pages.
Office Action Received for Japanese Patent Application No. 2012-551197, mailed on Sep. 24, 2013, 2 pages of Japanese Office Action and 2 pages of English Translation.
Okamoto, Eiji, "Akarui JohoukaSyakai no Jitugen wo Mezasu Angougijyutu (Encryption Technique for Brighter Information Society) 5," Angoukagi Haisou Kanri (Encryption Key Distribution Management), bit, Japan, Kyoritsu Shuppan Co., Ltd., Nov. 1, 1991, vol. 23. No. 12, pp. 51-59.
Office Action Received for Korean Patent Application No. 10-2012-7022407, mailed on Feb. 14, 2014, 4 Pages of Korean Office Action and 3 Pages of English Translation.
Office Action Received for Japanese Patent Application No. 2012-551197, mailed on Mar. 4, 2014, 2 Pages of Japanese Office Action and 3 Pages of English Translation.
Office Action Received for Chinese Patent Application No. 201180007466.9, mailed on Apr. 3, 2014, 10 Pages of Chinese Office Action and 8 Pages of English Translation.

* cited by examiner

ESTABLISHING, AT LEAST IN PART, SECURE COMMUNICATION CHANNEL BETWEEN NODES SO AS TO PERMIT INSPECTION, AT LEAST IN PART, OF ENCRYPTED COMMUNICATION CARRIED OUT, AT LEAST IN PART, BETWEEN THE NODES

FIELD

This disclosure relates to establishing, at least in part, a secure communication channel between nodes so as to permit inspection, at least in part, of encrypted communication carried out, at least in part, between the nodes.

BACKGROUND

In one conventional arrangement, an enterprise network may include a first network node that is coupled to a second network node. The second network node may couple the enterprise network to an external network that includes a third network node. The second network node may provide security features for the enterprise network that involve inspection and/or analysis of packets passing from the enterprise network to the external network, and vice versa.

In this conventional network arrangement, the first network node and the third network node may exchange encrypted communications with each other. These communications may be carried out based upon cryptographic keys that are exchanged by the first network node and the third network node, but are not disclosed to the second network node. This may prevent the second network node from being able to perform meaningful inspection of and/or analysis of the contents of the encrypted communications between the first network node and the third network node. Disadvantageously, this may compromise the enterprise network's security, and may otherwise deleteriously effect the enterprise network (e.g., by permitting introduction of viruses, etc. to the enterprise network).

Furthermore, a relatively large number of secure connections may traverse the second network node. In this conventional arrangement, in order to perform such meaningful inspection and/or other analysis, the second network node associates each of these connections with its respective cryptographic keys and/or other information. This may pose a significant connection scalability issue in this conventional arrangement that may significantly reduce both the number of connections that may be processed and the speed with which such processing may be carried out in this conventional arrangement. Additionally, in this conventional arrangement, the number and characteristics of these secure connections may not be static over time, and in fact, may drastically change over relatively short time intervals. Given these dynamically changing connections, in order to be able to perform such meaningful inspection and/or other analysis, a significant amount of connection synchronization processing overhead may be imposed on the second network node.

Also, in this conventional arrangement, each respective secure connection between the first and third nodes may involve a respective secure connection between the second and third nodes. For each respective secure connection between the second and third network nodes, the second network node may negotiate a respective cryptographic key with third network node that may be used to establish the respective secure connection. Given the relatively large number of connections that may exist in this conventional arrangement, undesirably large numbers of key negotiations and associated handshakes may occur, and an undesirably large number of keys may be negotiated between the second and third nodes. Additionally, undesirably large amounts of key storage and processing may be involved in this conventional arrangement.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
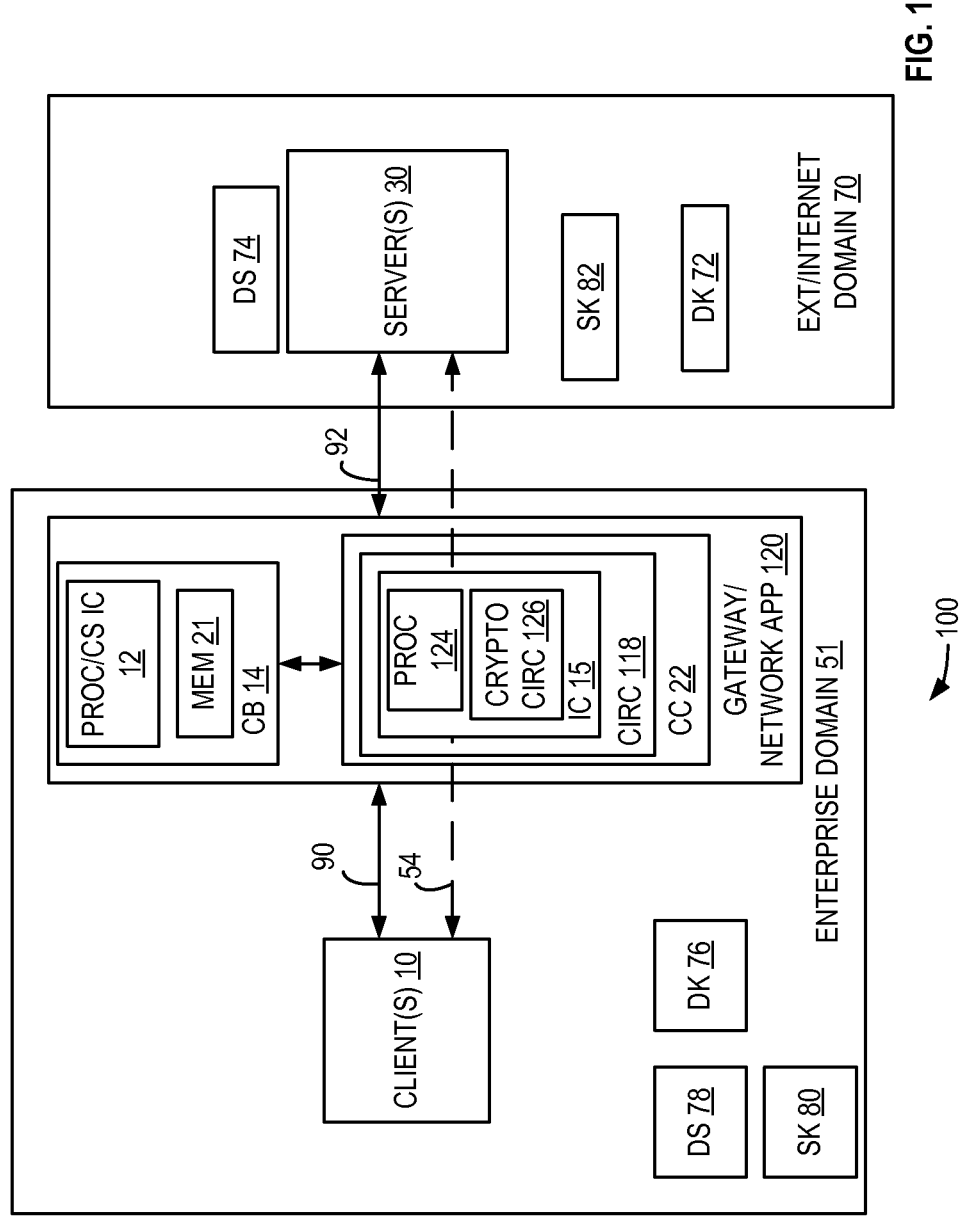
FIG. 1 illustrates a system embodiment.

FIG. 1 illustrates a system embodiment 100. System 100 may include an enterprise domain 51 that may be communicatively coupled to another domain 70. Domain 70 may be external, at least in part, to enterprise domain 51, and may be, comprise, and/or utilize, at least in part, an internet domain. Enterprise network 51 may comprise one or more client network nodes 10 that may be communicatively coupled to one or more gateway and/or network appliance nodes 120. One or more nodes 120 may be communicatively coupled to domain 70 and/or one or more server nodes 30 that may be comprised in domain 70.

In this embodiment, a "node" may mean an entity that is communicatively coupled in and/or to a network, such as, for example, an end station, appliance, mass storage, intermediate station, network interface, client, server, smart phone, other communication device, and/or portion thereof. In this embodiment, a "client" and/or "client node" may be used interchangeably to mean a node that may comprise, but is not required to comprise, an end station. In this embodiment, an end station may be or comprise smart phone or other communication device. Also in this embodiment, an "intermediate node," "gateway," "gateway node," "network appliance," and/or "network appliance node" may be used interchangeably to mean a node that may be communicatively coupled to a plurality of other nodes, and may (but is not required to) provide, facilitate, and/or implement one or more services and/or functions, such as, for example, firewall, switching, forwarding, gateway, intrusion detection, load balancing, and/or routing services and/or functions. In this embodiment, a "server" and/or "server node" may be used interchangeably to mean a node that may provide, facilitate, and/or implement one or more services and/or functions to one or more clients, such as, for example, data storage, retrieval, and/or processing functions. In this embodiment, a "network" may be or comprise two or more nodes that are communicatively coupled together. Also in this embodiment, a node may be "communicatively coupled" to another node if the one node is capable of transmitting to and/or receiving from the other node one or more commands and/or data, such as, for example, via one or more wired and/or wireless communication links. In this embodiment, a "wireless communication link" may mean any modality, and/or portion thereof, that permits, at least in part, at least two nodes to be wirelessly communicatively coupled, at least in part. In this embodiment, a "wired communication link" may mean any modality and/or portion thereof, that permits, at least in part, at least two nodes to be communicatively coupled, at least in part, via non-wireless means, at least in part. Also as used in this embodiment, data may be or comprise one or more commands, and/or one or more commands may be or comprise data.

One or more nodes 120 may comprise circuit board (CB) 14. CB 14 may be or comprise a system motherboard that may comprise one or more host processor and/or chipset integrated circuits 12 and computer-readable/writable memory 21. CB 14 may comprise one or more (not shown) connectors that may permit circuit card (CC) 22 to be electrically and mechanically mated with CB 14 such that components in CB 14 (for example, one or more integrated circuits 12 and/or memory 21) and CC 22 (for example, operative circuitry 118 comprised in CC 22) may be communicatively coupled to each other.

Alternatively or additionally, without departing from this embodiment, some or all of the circuitry comprised in one or more integrated circuits 12 and/or memory 21 may be comprised in circuitry 118, and/or some or all of circuitry 118 may be comprised in one or more integrated circuits 12 and/or memory 21.

In this embodiment, "circuitry" may comprise, for example, singly or in any combination, analog circuitry, digital circuitry, hardwired circuitry, programmable circuitry, state machine circuitry, and/or memory that may comprise program instructions that may be executed by programmable circuitry. Also in this embodiment, "integrated circuit" may mean a semiconductor device and/or microelectronic device, such as, for example, a semiconductor integrated circuit chip. Additionally, in this embodiment, the terms "host processor," "processor," "processor core," "core," and/or "controller" may be used interchangeably to mean circuitry capable of performing, at least in part, one or more arithmetic and/or logical operations. Also in this embodiment, a "chipset" may comprise circuitry capable of communicatively coupling, at least in part, one or more processors, memory, and/or other circuitry.

Each of the nodes 10, 120, and/or 30 may comprise a respective not shown user interface system that may comprise, e.g., a keyboard, pointing device, and display system that may permit a human user to input commands to, and monitor the operation of, each respective node and/or system 100. Operative circuitry 118 may be communicatively coupled to one or more clients 10 and/or one or more servers 30.

Circuitry 118 may comprise one or more integrated circuits 15. One or more integrated circuits 15 may comprise one or more processor cores 124 and/or cryptographic circuitry 126. In this embodiment, circuitry 118, one or more integrated circuits 15, one or more cores 124, and/or circuitry 126 may be capable of carrying out, at least in part, the cryptographic and/or related operations described herein as being carried out by circuitry 118.

One or more machine-readable program instructions may be stored in computer-readable/writable memory 21. In operation of one or more nodes 120, these instructions may be accessed and executed by one or more integrated circuits 12, circuitry 118, one or more integrated circuits 15, one or more processor cores 124, and/or circuitry 126. When so executed, these one or more instructions may result in one or more one or more integrated circuits 12, circuitry 118, one or more integrated circuits 15, one or more processor cores 124, and/or circuitry 126 performing the operations described herein as being performed by one or more integrated circuits 12, circuitry 118, one or more integrated circuits 15, one or more processor cores 124, and/or circuitry 126. Memory 21 may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

In this embodiment, a "domain" may comprise one or more nodes and a (not shown) domain authority. In this embodiment, a "domain authority" may comprise one or more entities capable of providing, implementing, and/or facilitating, at least in part, one or more functions, features, protocols, and/or operations related and/or involved in whole or in part to authentication, identification, and/or security. For example, domains 51 and/or 70 may each comprise one or more respective (not shown) domain authorities that may be communicatively coupled to one or more nodes 10, 120, and/or 30. Alternatively or additionally, some or all of the functions and/or operations of one or more domain authorities in system 100 may be carried out, at least in part, by one or more nodes 120 and/or 30.

Circuitry 118 may exchange data and/or commands with one or more clients 10 and/or one or more servers 30 in accordance with one or more communication protocols. For example, in this embodiment, these one or more protocols may be compatible with, e.g., an Ethernet protocol, Transmission Control Protocol/Internet Protocol (TCP/IP) protocol, Security Architecture for IP (IPsec), and/or Transport Layer Security (TLS) protocol.

The Ethernet protocol that may be utilized in system 100 may comply or be compatible with the protocol described in Institute of Electrical and Electronics Engineers, Inc. (IEEE) Std. 802.3, 2000 Edition, published on Oct. 20, 2000. The TCP/IP protocol that may be utilized in system 100 may comply or be compatible with the protocols described in Internet Engineering Task Force (IETF) Request For Comments (RFC) 791 and 793, published September 1981. The IPsec protocol that may be utilized in system 100 may comply or be compatible with the protocol described in IETF RFC 4301, published December 2005. The TLS protocol that may be utilized in system 100 may comply or be compatible with the protocol described in IETF RFC 4346, "The Transport Layer Security (TLS) Protocol Version 1.1," published April 2006. Of course, many different, additional, and/or other protocols (e.g., security-related and/or implementing protocols) may be used for such data and/or command exchange without departing from this embodiment, including for example, later-developed versions of the aforesaid and/or other protocols.

Figure 5:
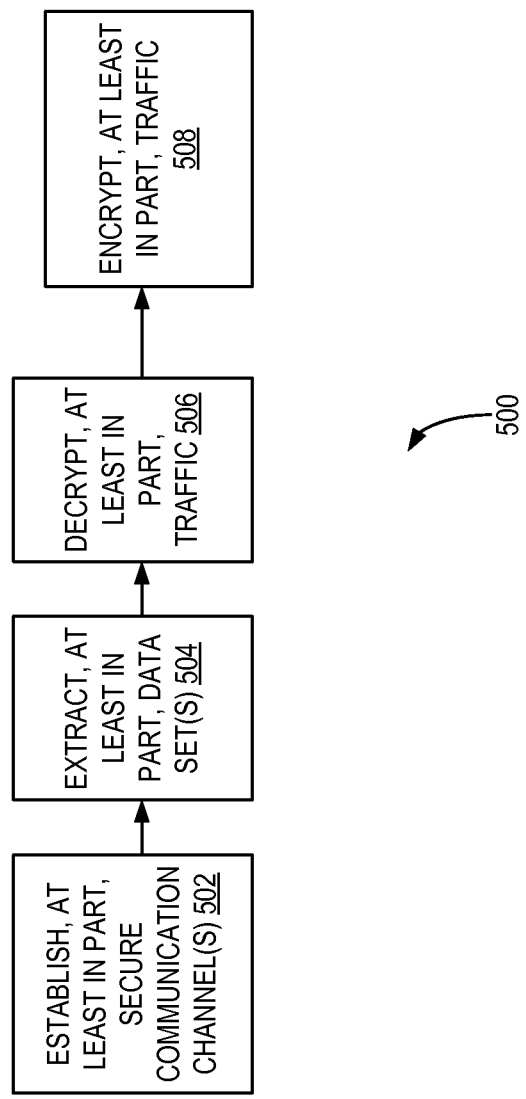
FIG. 5 illustrates operations in an embodiment.

With reference being made to FIG. 5, system 100 may perform, at least in part, operations 500. For example, in operation of system 100, circuitry 118 may exchange data and/or commands with one or more clients 10 and/or one or more servers 30 that may establish, at least in part, one or more secure communication channels 54 between, at least in part, one or more clients 10 and one or more servers 30, via circuitry 118 and/or one or more not shown non-intermediary nodes (see operation 502). In this embodiment, one or more channels 54 may comprise one or more sessions 90 in domain 51 and one or more sessions 92 in domain 70. One or more sessions 90 may be or comprise one or more secure sessions in domain 51 that may be between, and may communicatively couple, at least in part, the one or more clients 10 and one or more nodes 120 (i.e., circuitry 118 in one or more nodes 120). One or more sessions 92 may be or comprise one or more secure sessions in domain 70 that may be between, and may communicatively couple, at least in part, circuitry 118 and one or more servers 30. As is discussed in below, one or more sessions 90 and one or more sessions 92 operate in such a way as to provide, when taken together, one or more channels 54.

In this embodiment, the terms "session" and "channel" may be used interchangeably, and may comprise an exchange of data and/or commands between or among at least two entities. Also in this embodiment, a "secure session" may comprise a session in which at least a portion of the data and/or commands is encrypted, at least in part. In this embodiment, "encryption" and/or "encrypting" may comprise one or more operations comprised in, facilitating, and/or resulting in, at least in part, generation of cipher text from plaintext. Also in this embodiment, "decryption" and/or "decrypting" may comprise one or more operations comprised in, facilitating, and/or resulting in, at least in part, generation of plaintext from cipher text. Additionally, in this embodiment, "plaintext" may include data that is, at least in part, encrypted and/or has already undergone and/or is presently undergoing encryption and/or decryption. In this embodiment, a "key" may comprise one or more symbols and/or values that may be used in encryption and/or decryption.

For example, in this embodiment, one or more clients 10 may transmit to circuitry 118 one or more packets that are intended to initiate the establishment of one or more secure channels 54 between one or more clients 10 and one or more servers 30. In response, at least in part, to these one or more packets, circuitry 118 may exchange data and/or commands with one or more clients 10 that may result in the establishment of one or more sessions 90. Contemporaneously, in this embodiment, circuitry 118 may exchange data and/or commands with one or more servers 30 that may result in the establishment of one or more sessions 92.

As part of the data and/or command exchange between circuitry 118 and one or more clients 10, circuitry 118 may transmit, in a secure fashion (e.g., as part of a TLS control channel handshake, an out-of-band technique involving TCP and/or IP options, and/or IPsec Internet Key Exchange) to one or more client nodes 10 one or more session keys (SK) 80. Prior to transmitting one or more keys 80 to one or more clients 10, one or more nodes 120 may generate, at least in part, one or more keys 80 based at least in part upon one or more cryptographic operations (e.g., comprising one or more one-way hashing functions) involving, at least in part, as input operands, one or more domain keys (DK) 76 and one or more data sets (DS) 78. Thus, the one or more keys 80 may be generated, at least in part, as a result of negotiation, at least in part, between one or more nodes 120 and one or more clients 10 in domain 51.

One or more keys 76 may be assigned to domain 51 by one or more not shown domain authorities in domain 51. These one or more domain authorities may generate and distribute, at least in part, the one or more keys 76 to one or more nodes 120. However, the one or more domain authorities and the one or more nodes 120 may maintain in secrecy from one or more client nodes 10 and other entities (e.g., entities inside and outside of domain 51) the one or more keys 76. One or more data sets 78 may be extracted (or otherwise obtained), at least in part, by circuitry 118 from one or more packets 204 (see FIG. 2) transmitted to one or more nodes 120 from one or more clients 10. One or more data sets 78 may be associated, at least in part, with one or more sessions 90. For example, one or more data sets 78 may include one or more values 202 that may identify, at least in part, one or more sessions 90. These one or more values 202 may be or comprise, at least in part, respective concatenations of one or more respective unique identifiers of the one or more clients 10 and/or one or more nodes 120. Alternatively (at least in part) or additionally, one or more values 202 may comprise, at least in part, one or more respective identifiers of one or more servers 30. These unique identifies may be or comprise, for example, one or more respective addresses, IPsec Security Parameter Indices, and/or other values (e.g., session context information).

In this embodiment, the one or more not shown domain authorities of domain 51 may generate one or more keys 76 such that (1) one or more keys 76 may be uniquely associated with the domain 51, and (2) one or more keys 76 may be essentially unobtainable from one or more keys 80 (e.g., from a practical cryptographic standpoint). In an embodiment, one or more keys 76 may be or comprise one or more cryptographically strong random numbers.

Using one or more keys 80, each of the respective clients 10 may encrypt, at least in part, its respective traffic transmitted to the one or more nodes 120 via one or more sessions 90, and may decrypt, at least in part, the respective traffic that it receives from the one or more nodes 120 via one or more sessions 90. In this embodiment, this traffic to one or more nodes 120 may comprise one or more packets (e.g., in one or more packets 204) in which the one or more values 202 and/or data sets 78 are transmitted as plaintext. One or more values 202 and/or one or more data sets 78 may be chosen so as to permit, when used in the above-described manner together with the one or more keys 76 in one or more cryptographic operations to generate one or more keys 80, each of the one or more keys 80 to be or comprise a respective independent session key that may be used to provide a respective independent secure session between one or more gateways 120 and one or more clients 10.

As part of the data and/or command exchange between circuitry 118 and one or more servers 30, circuitry 118 may transmit, in a secure fashion (e.g., as part of a TLS control channel handshake, an out-of-band technique involving TCP and/or IP options, and/or IPsec Internet Key Exchange) to one or more servers 30 one or more session keys 82. Prior to transmitting one or more keys 82 to one or more servers 30, one or more nodes 120 may generate, at least in part, one or more keys 82 based at least in part upon one or more cryptographic operations (e.g., comprising one or more one-way hashing functions) involving, at least in part, as input operands, one or more domain keys 72 and one or more data sets 74. Thus, the one or more keys 82 may be generated, at least in part, as a result of negotiation, at least in part, between one or more nodes 120 in domain 51 and one or more servers 30 in domain 70.

One or more keys 72 may be assigned to domain 70 by one or more not shown domain authorities in domain 70. These one or more domain authorities may generate and distribute, at least in part, the one or more keys 72 to one or more nodes 120. However, the one or more domain authorities and the one or more nodes 120 may maintain in secrecy from one or more server nodes 30 and other entities (e.g., other entities inside and outside of domain 70) the one or more keys 72. One or more data sets 74 may be extracted (or otherwise obtained), at least in part, by circuitry 118 from one or more packets 208 (see FIG. 2) transmitted to one or more nodes 120 from one or more servers 30. One or more data sets 74 may be associated, at least in part, with one or more sessions 92. For example, one or more data sets 74 may include one or more values 206 that may identify, at least in part, one or more sessions 92. These one or more values 206 may be or comprise, at least in part, respective concatenations of one or more respective unique identifiers of the one or more servers 30 and/or one or more nodes 120. Alternatively (at least in part) or additionally, one or more values 206 may comprise, at least in part, one or more respective identifiers of one or more clients 10. These unique identifies may be or comprise, for example, one or more respective addresses, IPsec Security Parameter Indices, and/or other values (e.g., session context information).

Thus, in this embodiment, depending upon, for example, the domain of operation, one or more values 206 and/or one or more data sets 74 may be identical, at least in part, to one or more values 202 and/or one or more data sets 78, respectively. Alternatively, without departing from this embodiment, depending upon, for example, the domain of operation, one or more values 206 and/or one or more data sets 74 may be different, at least in part, from one or more values 202 and/or one or more data sets 78, respectively.

In this embodiment, the one or more not shown domain authorities of domain 70 may generate one or more keys 72 such that (1) one or more keys 72 may be uniquely associated with the domain 70, and (2) one or more keys 72 may be essentially unobtainable from one or more keys 82 (e.g., from a practical cryptographic standpoint). In an embodiment, one or more keys 72 may be or comprise one or more cryptographically strong random numbers.

Using one or more keys 82, each of the respective servers 30 may encrypt, at least in part, its respective traffic transmitted to the one or more nodes 120 via one or more sessions 92, and may decrypt, at least in part, the respective traffic that it receives from the one or more nodes 120 via one or more sessions 92. In this embodiment, this traffic to one or more nodes 120 may comprise one or more packets (e.g., comprised in one or more packets 208) in which the one or more values 206 and/or data sets 74 are transmitted as plaintext. One or more values 206 and/or one or more data sets 74 may be chosen so as to permit, when used in the above-described manner together with the one or more keys 72 in one or more cryptographic operations to generate one or more keys 82, each of the one or more keys 82 to be or comprise a respective independent session key that may be used to provide a respective independent secure session between one or more gateways 120 and one or more servers 30. In this embodiment, one or more domain keys 76 may be different, at least in part, from one or more domain keys 72.

Figure 2:
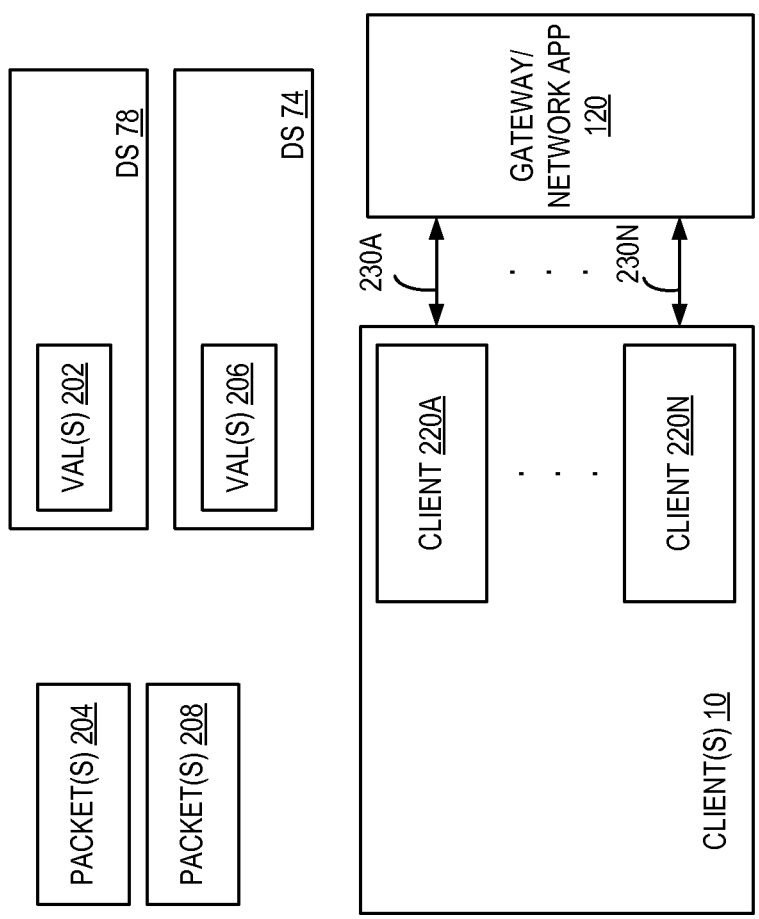
FIG. 2 illustrates features in an embodiment.

As shown in FIG. 2, in this embodiment, in domain 51, one or more clients 10 may comprise a plurality of clients 220A . . . 220N, and one or more sessions 90 may comprise a plurality of secure sessions 230A . . . 230N between the clients 220A . . . 220N and the one or more gateway nodes 120. Sessions 230A . . . 230N may respectively communicatively couple clients 220A . . . 220N to one or more nodes 120. As stated previously, each of these secure sessions 230A . . . 230N may be generated based at least in part upon a respective one of the one or more session keys 80.

Figure 3:
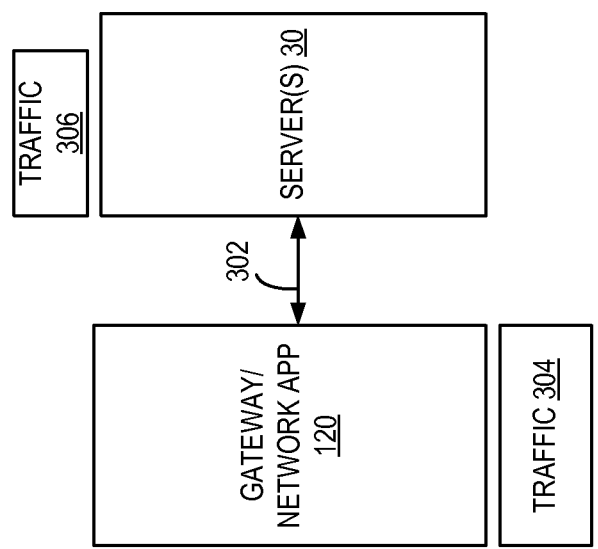
FIG. 3 illustrates features in an embodiment.

Turning now to FIG. 3, one or more sessions 92 may comprise a single secure session 302 that may communicatively couple one or more gateways 120 to one or more servers 30. In this arrangement, session 302 may encapsulate, at least in part, sessions 230A . . . 230N (see FIG. 2). In this embodiment, encapsulation may comprise incorporating, at least in part, a first entity into at least a portion of second entity, and/or incorporating at least a portion of a first entity's information into at least a portion second entity, such as, for example, encapsulating one or more packets into one or more frames.

For example, network traffic 304 may be transmitted via sessions 230A . . . 230N from clients 220A . . . 220N to circuitry 118 in one or more gateways 120. As transmitted to circuitry 118 via sessions 230A . . . 230N, traffic 304 may be encrypted, at least in part, based at least in part upon one or more session keys 80. However, in traffic 304, one or more data sets 78 and/or one or more values 202 may be transmitted as plaintext. Circuitry 118 may extract, at least in part, the one or more data sets 78 and/or one or more values 202 from the traffic 304. Based at least in part upon thus extracted one or more data sets 78 and/or one or more values 202, and one or more domain keys 76, circuitry 118 may dynamically reconstruct (e.g., on a packet-by-packet basis), for each of the sessions 230A . . . 230N, the respective one or more session keys 80 used to encrypt, at least in part, traffic 304. Circuitry 118 may decrypt, at least in part, the traffic 304, based at least in part upon the thus dynamically reconstructed one or more session keys 80. Circuitry 118 may examine, at least in part, the thus decrypted, at least in part, traffic 304. Such examination may involve, for example, pattern matching, signature, checksum, validity check, and/or other analysis techniques to detect and/or appropriately address presence of unauthorized and/or undesired data and/or instructions in traffic 304.

Circuitry 118 may encrypt, at least in part, the unencrypted traffic 304, based at least in part upon one or more session keys 82, and may transmit the encrypted traffic to one or more servers 30 via the single session 302. Prior to this, circuitry 118 may dynamically reconstruct (in a similar manner to that described above in connection with one or more keys 80) one or more session keys 82 based at least in part upon one or more values 206 and/or one or more data sets 74, and one or more domain keys 72.

One or more servers 30 may transmit traffic 306 to circuitry 118 in one or more gateways 120 via the session 302. As transmitted to circuitry 118 via the single session 302, traffic 306 may be encrypted, at least in part, based at least in part upon one or more session keys 82. However, in traffic 306, one or more data sets 74 and/or one or more values 206 may be transmitted as plaintext. Circuitry 118 may extract the one or more data sets 74 and/or one or more values 206 from the traffic 306. Based at least in part upon thus extracted one or more data sets 74 and/or one or more values 206, and one or more domain keys 72, circuitry 118 may dynamically reconstruct, one or more session keys 82 used to encrypt, at least in part, traffic 306. Circuitry 118 may decrypt, at least in part, the traffic 306, based at least in part upon the thus dynamically reconstructed one or more session keys 82. Circuitry 118 may examine, at least in part, the thus decrypted, at least in part, traffic 306. Such examination may involve, for example, pattern matching, signature, checksum, validity check, and/or other analysis techniques to detect and/or appropriately address presence of unauthorized and/or undesired data and/or instructions in traffic 306.

Circuitry 118 may encrypt, at least in part, the unencrypted traffic 306, based at least in part upon one or more session keys 80, and may transmit the encrypted traffic to clients 220A . . . 220N via the sessions 230A . . . 230N. Prior to this, circuitry 118 may dynamically reconstruct one or more session keys 80, based at least in part upon one or more values 202 and/or one or more data sets 78, and one or more domain keys 76.

Figure 4:
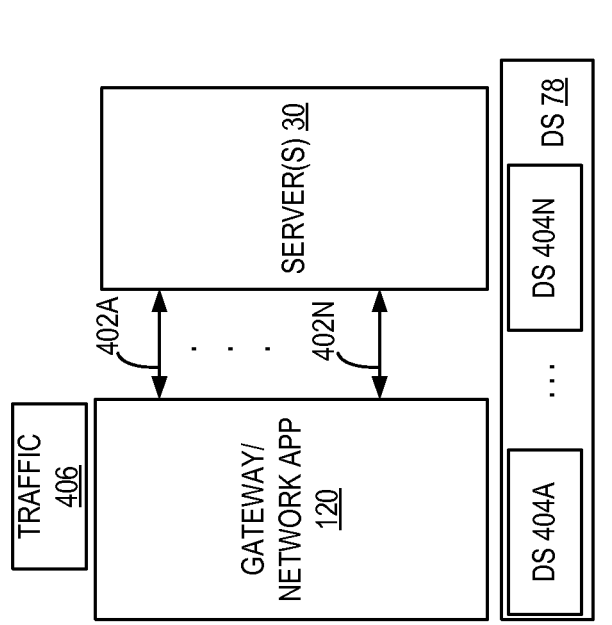
FIG. 4 illustrates features in an embodiment.

Alternatively, one or more sessions 92 may comprise a plurality of secure sessions 402A . . . 402N (see FIG. 4) in domain 70 that may communicatively couple one or more gateways 120 and one or more servers 30. The secure sessions 402A . . . 402N may respectively correspond to secure sessions 230A . . . 230N. In this embodiment, one or more data sets 78 may comprise respective data sets 404A . . . 404N that may be associated with sessions 230A . . . 230N. For example, the one or more respective sessions keys 80 based upon which sessions 230A . . . 230N may be encrypted, at least in part, may be generated, based at least in part, upon data sets 404A . . . 404N, respectively, and one or more domain keys 76. Circuitry 118 may extract, at least in part, the data sets 404A . . . 404N from the traffic 304 transmitted to circuitry 118 from clients 220A . . . 220N via sessions 230A . . . 230N, respectively (see operation 504 in FIG. 5). Based at least in part upon thus extracted data sets 404A . . . 404A and one or more domain keys 76, circuitry 118 may dynamically reconstruct (e.g., on a packet-by-packet basis), for each of the sessions 230A . . . 230N, the respective one or more session keys 80 used to encrypt, at least in part, the traffic 304 transmitted via the respective sessions 230A . . . 230N. Circuitry 118 may decrypt, at least in part, this traffic 304, based at least in part upon the thus dynamically reconstructed one or more session keys 80 (see operation 506 in FIG. 5). Circuitry 118 may examine, at least in part, the thus decrypted, at least in part, traffic, in the manner described previously.

Circuitry 118 may encrypt, at least in part, the unencrypted traffic 304, based at least in part upon one or more session keys 82, and may transmit the encrypted traffic 406 to one or more servers 30 via the sessions 402A . . . 402N (see operation 508 in FIG. 5). Prior to this, circuitry 118 may dynamically reconstruct (in a similar manner to that described previously) one or more session keys 82 based at least in part upon one or more values 206 and/or one or more data sets 74, and one or more domain keys 72.

Alternatively, one or more domain keys 76 may be identical, at least in part, to one or more keys 72. Further alternatively or additionally, one or more gateways 120 may provide one or more keys 76 and/or one or more keys 72 to one or more servers 30 via one or more secure handshake and/or negotiation operations. This may permit one or more servers 30 to be able to dynamically reconstruct one or more session keys 82, and/or perform decryption and/or encryption operations, in the manner described above in connection with circuitry 118.

Advantageously, in this embodiment, regardless of the number of individual sessions comprised in one or more sessions 90, circuitry 118 may perform a single key negotiation transaction (e.g., resulting in exchange and/or negotiation of a single session key 82 and/or a single domain key 72) with one or more servers 30 that may permit all of one or more sessions 92 to be established (e.g., based at least in part upon the single session key 82 and/or single domain key 72). As a result, in this embodiment, only a single handshake operation may be comprised in such transaction. Advantageously, in this embodiment, this may significantly reduce the number of key negotiations, keys negotiated, and handshakes between circuitry 118 and one or more servers 30 involved in establishing one or more sessions 92. Further advantageously, this may significantly reduce the amount of key storage utilized in this embodiment.

In this embodiment, the generation of keys 80 and/or 82 may be carried out generally in accordance with, at least in part, principles disclosed in, e.g., (1) U.S. patent application Ser. No. 11/731,562, filed Mar. 30, 2007, and published Oct. 28, 2008, as Durham et al., U.S. Patent Application Publication No. U.S. 2008/0244268, and/or (2) U.S. patent application Ser. No. 12/396,125, filed Mar. 2, 2009. Of course, many other, additional, and/or alternative techniques may be used to generate, at least in part, one or more keys 80 and/or one or more keys 82.

Thus, an embodiment may include circuitry to establish, at least in part, a secure communication channel between, at least in part, a client in a first domain and a server in a second domain. The channel may include a first and second domain sessions in the first and second domains. The circuitry may generate first and second domain session keys that may encrypt, at least in part, respectively, the first and second domain sessions. The first domain session key may be generated based upon a first domain key assigned to the first domain and a first data set associated with the first domain session. The second domain session key may be generated based upon a second domain key assigned to the second domain and a second data set associated with the second domain session.

In this embodiment, circuitry 118 may be capable of dynamically generating one or more session keys 80 and/or 82 based at least in part upon one or more data sets 78 and/or 74 extracted, at least in part, from one or more packets 204 and/or 208. Advantageously, this may permit circuitry 118 to be able to avoid (1) having to maintain persistent associations in memory between the sessions generated based at least in part upon such session keys and the session keys themselves, and/or (2) persistently storing a substantial amount of transport layer and cryptographic state information, and buffering for respective sessions. Advantageously, this may significantly improve connection scalability and processing speed in this embodiment.

Also in this embodiment, as a result at least in part of being able to dynamically generate one or more keys 80 and/or 82 in the manner described above, circuitry 118 may be capable of dynamically decrypting and/or encrypting traffic transmitted to and/or from, respectively, the circuitry 118. Advantageously, this may permit circuitry 118 and/or one or more nodes 120 to be able to perform meaningful inspection of and/or analysis of the contents of the encrypted communications between the one or more clients 10 and the one or more servers 30 (e.g., via one or more secure channels 54). Advantageously, this may prevent compromise of the security of the enterprise domain 51 and/or system 100, and may otherwise improve the performance of the enterprise domain 51 and/or system 100 (e.g., by preventing the introduction of viruses to and/or removing viruses from the domain 51 and/or system 100).

Thus, advantageously, the features of this embodiment may reduce the amount of processing bandwidth consumed by security, communication, and/or cryptographic processing, while also improving the speed with which such processing may be executed. Also advantageously, the features of this embodiment may permit such processing to be more easily implemented by specialized transport layer and/or cryptographic offload and/or acceleration hardware.

What is claimed is:

1. An apparatus for use in a network comprising a client and a server, comprising circuitry to, when in operation:
receive respective network packets belonging to different respective client-server sessions, the network packets including cipher text;
determine respective session specific decryption keys for the respective network packets based on information included in the respective network packets and a key used to determine the session specific decryption keys for the different respective client-server sessions;
decrypt cipher text in the respective network packets based on the respective session specific decryption keys to generate a plaintext;
encrypt the plaintext for the respective network packets; and
cause the respective network packets to be forwarded toward the server of the client-server sessions;
wherein the information included in the respective network packets comprises a respective client id and server id of the respective network packets; and wherein the client id comprises an address and the server id comprises an address.

2. The apparatus of claim 1, further comprising inspecting at least some of the plaintext.

3. The apparatus of claim 1, wherein the apparatus comprises a gateway network device to be intermediate to the client and the server.

4. The apparatus of claim 1, wherein the circuitry comprises programmable circuitry to operate on program instructions.

5. Computer-readable memory storing one or more instructions that when executed by a machine result in execution of operations to:

receive respective network packets belonging to different respective client-server sessions, the network packets including cipher text;

determine respective session specific decryption keys for the respective network packets based on information included in the respective network packets and a key used to determine the session specific decryption keys for the different respective client-server sessions;

decrypt cipher text in the respective network packets based on the respective session specific decryption keys to generate a plaintext;

encrypt the plaintext for the respective network packets; and cause the respective network packets to be forwarded toward the server of the client-server sessions;

wherein the information included in the respective network packets comprises a respective client id and server id of the respective network packets; and wherein the client id comprises an address and the server id comprises an address.

6. The memory of claim 5, further comprising inspecting at least some of the plaintext.

7. The memory of claim 5, wherein the machine comprises a gateway network device to be intermediate to the client and the server.

\* \* \* \* \*